United States Patent
Sagona

(10) Patent No.: US 9,071,051 B2
(45) Date of Patent: Jun. 30, 2015

(54) OVERVOLTAGE PROTECTION UNIT WITH AC INPUT CURRENT SENSORS

(71) Applicant: Hamilton Sundstrand Corporation, Windsor Locks, CT (US)

(72) Inventor: John Duward Sagona, Poplar Grove, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 120 days.

(21) Appl. No.: 13/862,843

(22) Filed: Apr. 15, 2013

(65) Prior Publication Data

US 2014/0307490 A1    Oct. 16, 2014

(51) Int. Cl.
 H02M 7/00   (2006.01)
 H02H 7/125  (2006.01)
 H02H 9/04   (2006.01)
 H02H 3/05   (2006.01)

(52) U.S. Cl.
 CPC ............. H02H 7/1252 (2013.01); H02H 9/04 (2013.01); H02H 9/041 (2013.01); H02H 3/05 (2013.01)

(58) Field of Classification Search
 USPC ............... 323/34–38, 78, 84, 89, 124–127; 363/34–38, 78, 84, 89, 124–127
 See application file for complete search history.

(56) References Cited

U.S. PATENT DOCUMENTS

| | | | | |
|---|---|---|---|---|
| 5,265,002 A | * | 11/1993 | Bando et al. | 363/54 |
| 5,847,949 A | * | 12/1998 | Jiang | 363/65 |
| 5,861,734 A | * | 1/1999 | Fasullo et al. | 323/222 |
| 2002/0135328 A1 | * | 9/2002 | Hanaoka et al. | 318/37 |
| 2005/0285583 A1 | * | 12/2005 | Takahashi et al. | 323/282 |
| 2009/0128347 A1 | * | 5/2009 | Bucella et al. | 340/654 |
| 2010/0296326 A1 | * | 11/2010 | Unger et al. | 363/146 |
| 2012/0039101 A1 | * | 2/2012 | Falk et al. | 363/95 |

FOREIGN PATENT DOCUMENTS

EP    2573891 A2    3/2013

OTHER PUBLICATIONS

European Search Report dated May 14, 2014, for EP14161437.0.

* cited by examiner

*Primary Examiner* — Jeffrey Gblende
(74) *Attorney, Agent, or Firm* — Kinney & Lange, P.A.

(57) ABSTRACT

An overvoltage protection unit includes a power circuit module and a controller module. The power circuit module receives power from a power source on an AC input and includes a rectifier that converts voltage on the AC input into a DC Link output voltage, and an AC input current sensor that senses a current on the AC input. The controller module provides an output to terminate power from the power source based upon the DC Link output voltage and a sensed current from the AC input current sensor.

15 Claims, 2 Drawing Sheets

OVERVOLTAGE PROTECTION UNIT WITH AC INPUT CURRENT SENSORS

BACKGROUND

Electrical systems, such as those of an aircraft, may include variable frequency (VF) generators for power generation. These generators often include generator controllers that monitor and control the operation of the generator. In addition to the generator controller, these electrical systems often include overvoltage protection units that monitor voltage at a second point of protection.

Generator controllers, commonly referred to as generator control units (GCUs), regulate the operation of associated generators. For example, the GCU monitors the output voltage of the generator and regulates the current supplied to the exciter winding to regulate the output voltage to a desired value. In addition, the GCU provides protection against faults such as overvoltage faults. For example, if the circuit used to regulate the current supplied to the exciter winding fails, the GCU may trip a relay to disconnect power from the exciter winding, and may trip another relay to disconnect the generator output from a distribution bus to protect devices and components connected thereto.

SUMMARY

An overvoltage protection unit includes a power circuit module and a controller module. The power circuit module receives power from an AC power source on an AC input. The power circuit module includes a rectifier that converts voltage on the AC input into a DC Link voltage, and an AC input current sensor that senses a current on the AC input. The controller module provides an output to terminate power from the power source based upon the DC Link voltage and a sensed current from the AC input current sensor.

DETAILED DESCRIPTION

The present invention relates to power systems, and in particular to an overvoltage protection system for a variable frequency (VF) generator. An overvoltage transient protection unit (OVTPU) includes both overvoltage protection for loads, as well as internal fault protection of the OVTPU itself. The OVTPU converts an AC three-phase input into a DC Link voltage. The OVTPU monitors the DC Link voltage to determine if it is greater than a threshold value. If it is, then the OVTPU provides a termination signal to a generator control unit (GCU) in order to terminate power from the VF generator. The OVTPU also includes three AC input current sensors on the three AC inputs. These current sensors monitor each input line to determine if the current is greater than a threshold value. If any line contains too great of a current, the OVTPU sends a terminate signal to the GCU. This provides protection against faults, such as short circuit faults, within the OVTPU itself that would otherwise go undetected by the OVTPU.

Figure 1:
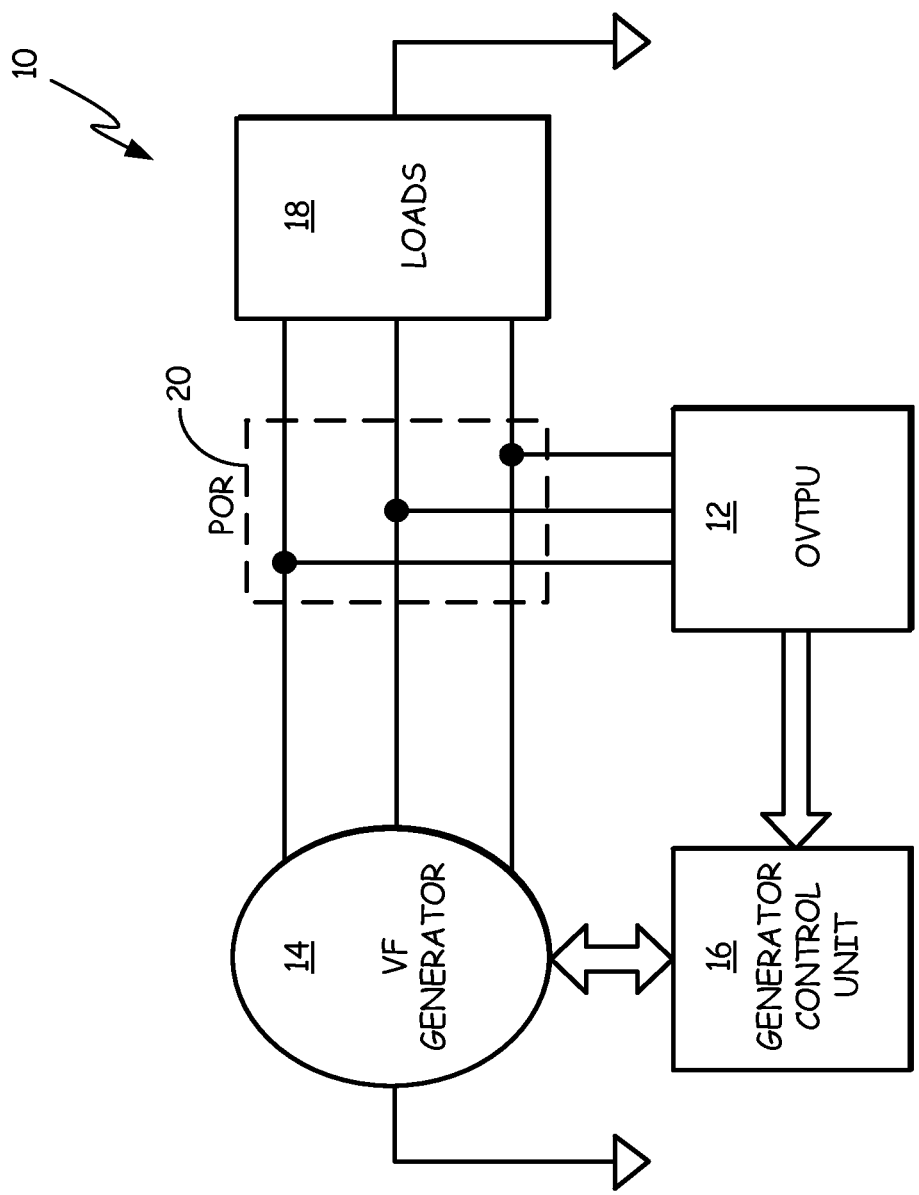
FIG. 1 is a block diagram illustrating an electrical power system that includes overvoltage protection.

FIG. 1 is a block diagram illustrating electrical power system 10 with redundant overvoltage protection. System 10 includes OVTPU 12, VF generator 14, generator control unit (GCU) 16, loads 18, and point of regulation (POR) 20. VF generator 14 is any generator such as, for example, a generator of an aircraft driven by a gas turbine engine. GCU 16 may be used to, among other things, regulate the operation and output of VF generator 14 using any known method. Loads 18 are any loads that receive power from VF generator 14 such as, for example, avionics systems of an aircraft.

In the present embodiment, OVTPU 12 monitors voltage at POR 20. Three inputs are provided to OVTPU 12, one for each phase of the three-phase output from VF generator 14. OVTPU 12 monitors for overvoltage events caused by, for example, load removal or arc faults. If OVTPU 12 detects an overvoltage, it sends a terminate signal to GCU 16. GCU 16 terminates power from VF generator 14 upon receiving this signal. OVTPU 12 may also provide a temporary low impedance path to dissipate energy generated by VF generator 14 when an overvoltage is detected at POR 20.

Figure 2:
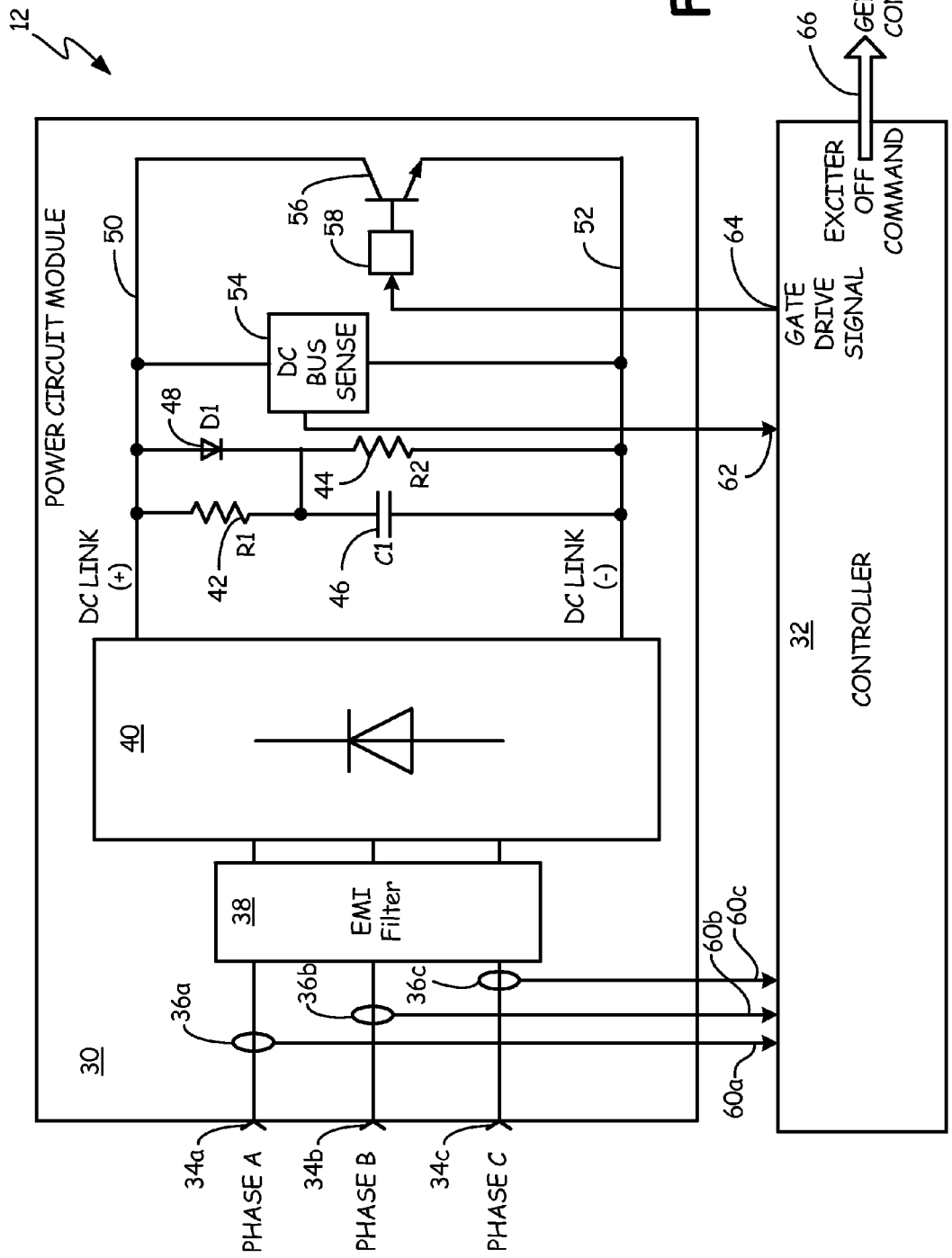
FIG. 2 is a circuit diagram illustrating an overvoltage protection unit that includes internal fault protection.

FIG. 2 is a circuit diagram illustrating OVTPU 12 that includes internal fault protection. OVTPU 12 includes power circuit module 30, and controller module 32. Power circuit module 30 includes three-phase inputs 34a-34c, current sensors 36a-36c, electromagnetic interference (EMI) filter 38, rectifier 40, resistors 42 and 44, capacitor 46, diode 48, DC line 50, return path 52, voltage sense device 54, switch 56, and gate driver 58. Controller module 32 includes current sensor inputs 60a-60c, voltage sense input 62, gate drive output 64, and exciter-off output 66. Switch 56 is any known electronic switch such as, for example, an insulated gate bipolar transistor (IGBT). Controller module 32 may be implemented as, for example, a plurality of integrated circuits, a field programmable gate array (FPGA), an application specific integrated circuit (ASIC), or any other digital logic circuit.

Power circuit module 30 monitors voltage and provides a low impedance path to return path 52 in the event of a detected overvoltage. Inputs 34a-34c provide AC three-phase voltage to OVTPU 12 from POR 20 of FIG. 1. Current sensors 36a-36c sense current on each of respective inputs 34a-34c. The sensed current values are provided to controller module 32 on inputs 60a-60c. Current sensors 36a-36c are any known sensors capable of sensing an electric current.

The voltage on inputs 34a-34c is filtered by EMI filter 38, and rectified by three-phase rectifier 40 to generate a DC output voltage on DC line 50. EMI filter 38 is any known EMI filter and is, for example, connected to a ground such as the chassis of an aircraft. Rectifier 40 is any known rectifier capable of rectifying a three-phase AC input into a DC output such as, for example, a six bridge rectifier. Capacitor 46 is charged through diode 48. Once capacitor 46 is charged, power module 30 draws a minimal amount of power from inputs 34a-34c.

During normal operation, switch 56 is off, and does not conduct between DC line 50 and return path 52. Voltage sense device 54 senses the voltage between DC line 50 and return path 52 and provides a sensed voltage to controller module 32 on input 62. Voltage sense device 54 may be implemented as, for example, a differential amplifier or any other known device capable of sensing a voltage. Controller module 32 monitors the sensed voltage to determine if an overvoltage condition is present. Resistor 44 is implemented to discharge capacitor 46 when the system is not in use so that capacitor 46 does not remain charged during, for example, maintenance.

In response to a detected overvoltage condition, switch 56 is turned on to create a low-impedance path between DC line 50 and return line 52. Controller module 32 detects an overvoltage condition using the sensed value on input 62. If this value is greater than a threshold value, controller module 32 provides an output on output 64 to gate driver 58. Switch 56 is turned on and begins conducting between DC line 50 and return path 52. Capacitor 46 discharges through resistor 42, and power is circulated through switch 56 and rectifier 40 on DC line 50 and return path 52. This dissipates a large amount of energy provided by the VF generator across switch 56. To prevent damage to power module 30, controller module 32 also provides an output on exciter-off output 66. This output is received by GCU 16 of FIG. 1. GCU 16 terminates power from VF generator 14 of FIG. 1 upon receiving this signal. This way, switch 56 is only turned on for a short amount of time, to temporarily dissipate the energy produced by VF generator 14 while GCU 16 is de-exciting VF generator 14.

The current on inputs 34a-34c is monitored by controller module 32 to determine if there is a fault within OVTPU 12. This fault may be, for example, a short circuit fault within any of the electronics of OVTPU 12, or any other fault that causes a large current draw on any of inputs 34a-34c. This fault would not cause an overvoltage on positive DC line 50, and thus, OVTPU 12 would not detect this fault without input current sensors 36a-36c.

Upon detection of an over-current condition on any of inputs 34a-34c, controller module 32 provides an output on exciter-off output 66 to terminate power from VF generator 14 of FIG. 1. Controller module 32 receives a sensed current from each current sensor 36a-36c on inputs 60a-60c. If any of the sensed values on these inputs 60a-60c are greater than a threshold value, controller module 32 detects a fault and provides a terminate signal to the GCU on output 66. This output is received by GCU 16 of FIG. 1. GCU 16 terminates power from VF generator 14 of FIG. 1 upon receiving this signal. Short circuit faults within OVTPU 12 can lead to large and undesirable power draws from VF generator 14. By detecting faults within OVTPU 12 and terminating power from VF generator 14, large power losses and negative affects on the circuits can be avoided.

The following are non-exclusive descriptions of possible embodiments of the present invention.

An overvoltage protection unit includes, among other things: a power circuit module that receives power from a power source on an AC input, and a controller module. the power circuit module includes a rectifier that converts voltage on the AC input into a DC Link output voltage, an AC input current sensor that senses a current on the AC input. The controller module provides an output to terminate power from the power source based upon the DC output voltage and a sensed current from the AC input current sensor.

The overvoltage protection unit of the preceding paragraph can optionally include, additionally and/or alternatively, any one or more of the following features, configurations and/or additional components:

The AC input is a three-phase AC input.

The controller module provides the output to terminate power if the sensed current from the AC input current sensor is greater than a first threshold value.

The controller module provides the output to terminate power if the DC Link output voltage is greater than a second threshold value.

The power circuit module further includes an electromagnetic interference filter that filters electromagnetic interference on the AC input.

The power circuit module further includes a switch, wherein the switch is enabled to provide a low impedance path between the DC Link output voltage and a return path.

The controller module enables the switch if the DC Link output voltage is greater than a threshold value.

A system includes, among other things: a generator that produces three-phase AC power for a load, and an overvoltage protection unit that monitors the three-phase AC power on three AC inputs. The overvoltage protection unit includes a power circuit module and a controller module. The power circuit module includes a rectifier that converts AC voltage on the three AC inputs into a DC Link voltage, and three current sensors that sense a current on each of the three AC inputs. The controller module terminates power from the generator based upon the DC Link voltage and sensed current from the three current sensors.

The system of the preceding paragraph can optionally include, additionally and/or alternatively, any one or more of the following features, configurations and/or additional components:

A generator control unit that controls output of the three-phase power from the generator. The controller module terminates power from the generator by sending a terminate signal to the generator control unit.

The controller module sends the terminate signal if the DC Link voltage is greater than a first threshold value, or a sensed current from one of the three current sensors is greater than a second threshold value.

The power circuit module further includes a switch. The switch is enabled to provide a low impedance path between the DC Link voltage and a return path if the DC Link voltage is greater than the first threshold value.

The power circuit module further includes an electromagnetic interference filter that filters electromagnetic interference on the three AC inputs.

A method of overvoltage protection includes, among other things: providing AC power from a generator to an overvoltage protection unit on an AC input, monitoring current on the AC input using a current sensor, converting the AC input into a DC Link output using a rectifier, monitoring the DC Link output using a voltage sense device, and terminating power from the generator if a monitored voltage from the voltage sense device is greater than a first threshold value, or if a monitored current from the current sensor is greater than a second threshold value.

The method of the preceding paragraph can optionally include, additionally and/or alternatively, any one or more of the following features, configurations and/or additional components:

Terminating power from the generator includes sending a terminate signal to a generator control unit.

Filtering the AC power includes using an electromagnetic interference filter.

A low impedance path for the DC Link output is provided if the monitored voltage from the voltage sense device is greater than the first threshold value.

Providing a low impedance path includes enabling a switch between the DC Link output and a return path if the monitored voltage from the voltage sense device is greater than the first threshold value.

The AC power is three-phase AC power.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An overvoltage protection unit comprising:
    a power circuit module that receives power from a power source on an AC input, the power circuit module comprising:
        a rectifier that converts voltage on the AC input into a DC Link output voltage;
        an AC input current sensor that senses a current on the AC input; and a switch;
    a controller module that provides an output to terminate power from the power source based upon the DC Link output voltage and a sensed current from the AC input current sensor, wherein the controller module detects a first fault external to the overvoltage protection unit based upon the DC Link output voltage and detects a second fault internal to the overvoltage protection unit based upon the AC input current sensor; and wherein the switch is enabled to provide a low impedance path between the DC Link output voltage and a return path to circulate current through the rectifier until the power from the power source is terminated.

2. The overvoltage protection unit of claim 1, wherein the AC input is a three-phase AC input.

3. The overvoltage protection unit of claim 1, wherein the controller module provides the output to terminate power if the sensed current from the AC input current sensor is greater than a first threshold value.

4. The overvoltage protection unit of claim 3, wherein the controller module provides the output to terminate power if the DC Link output voltage is greater than a second threshold value.

5. The overvoltage protection unit of claim 1, wherein the power circuit module further comprises an electromagnetic interference filter that filters electromagnetic interference on the AC input.

6. The overvoltage protection unit of claim 1, wherein the controller module enables the switch if the DC Link output voltage is greater than a threshold value.

7. A system comprising:
    a generator that produces three-phase AC power for a load;
    an overvoltage protection unit that monitors the three-phase AC power on three AC inputs, the overvoltage protection unit comprising:
        a power circuit module comprising a rectifier that converts AC voltage on the three AC inputs into a DC Link voltage, a switch and three current sensors that sense a current on each of the three AC inputs; and
        a controller module that terminates power from the generator based upon the DC Link voltage and sensed current from the three current sensors, wherein the controller detects a first fault external to the overvoltage protection unit based upon the DC Link voltage and detects a second fault internal to the overvoltage protection unit based upon the three current sensors; and wherein the switch is enabled to provide a low impedance path between the DC Link voltage and a return path if the DC Link voltage is greater than a first threshold value to circulate current through the switch and the rectifier until the three-phase AC power from the generator is terminated.

8. The system of claim 7, further comprising a generator control unit that controls output of the three-phase power from the generator, wherein the controller module terminates the three-phase AC power from the generator by sending a terminate signal to the generator control unit.

9. The system of claim 8, wherein the controller module sends the terminate signal if the DC Link voltage is greater than the first threshold value, or a sensed current from one of the three current sensors is greater than a second threshold value.

10. The system of claim 7, wherein the power circuit module further comprises an electromagnetic interference filter that filters electromagnetic interference on the three AC inputs.

11. The system of claim 7, wherein the power circuit module further comprises:
    a first circuit comprising a capacitor connected in parallel with a first resistor;
    a second circuit comprising a diode connected in parallel with a second resistor, wherein the first circuit is connected in series with the second circuit, and wherein the DC Link output voltage is sensed across the first circuit and the second circuit;
    wherein the capacitor discharges through the first resistor when the system is not in use; and
    wherein the capacitor discharges through the second resistor when the switch is enabled.

12. A method of overvoltage protection, the method comprising:
    providing AC power from a generator to an overvoltage protection unit on an AC input;
    monitoring current on the AC input using a current sensor;
    converting the AC input into a DC Link output using a rectifier;
    monitoring the DC Link output using a voltage sense device;
    detecting a first fault external to the overvoltage protection unit if a monitored voltage from the voltage sense device is greater than a first threshold value;
    detecting a second fault internal to the overvoltage protection unit if a monitored current from the current sensor is greater than a second threshold value;
    terminating power from the generator if the first fault or the second fault are detected; enabling a switch between the DC Link output and a return path if the monitored voltage from the voltage sense device is greater than the first threshold value; and circulating power through the switch and the rectifier until the power from the generator is terminated.

13. The method of claim 12, wherein terminating power from the generator comprises sending a terminate signal to a generator control unit.

14. The method of claim 12, further comprising filtering the AC power using an electromagnetic interference filter.

15. The method of claim 12, wherein the AC power is three-phase AC power.

* * * * *